3,152,352
DISPENSER FOR REJUVENATING WIPER BLADES
Samuel J. Kosik, Jr., 1900 E. 30th St., Suite 305,
Cleveland 15, Ohio
Filed Sept. 13, 1962, Ser. No. 223,453
1 Claim. (Cl. 15—539)

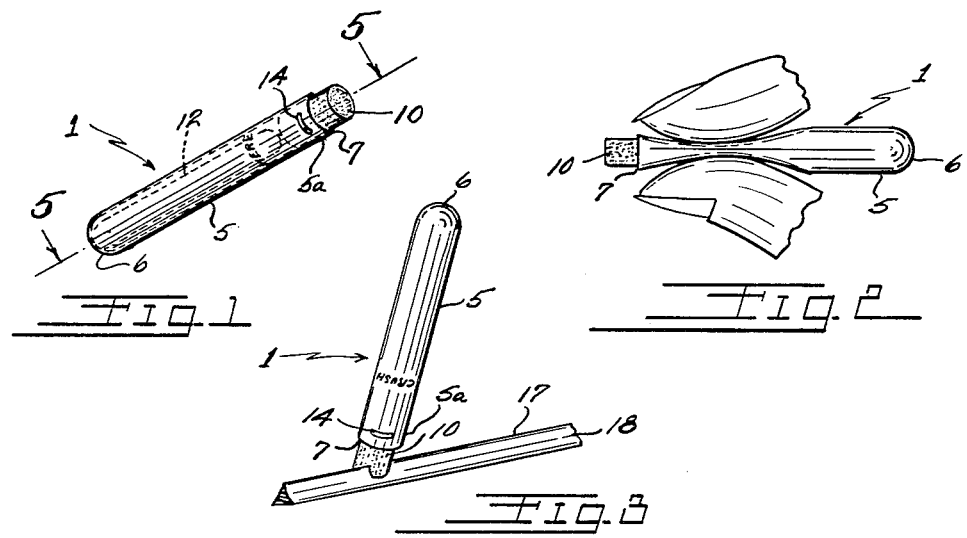
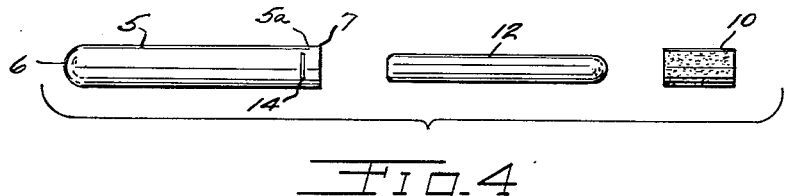
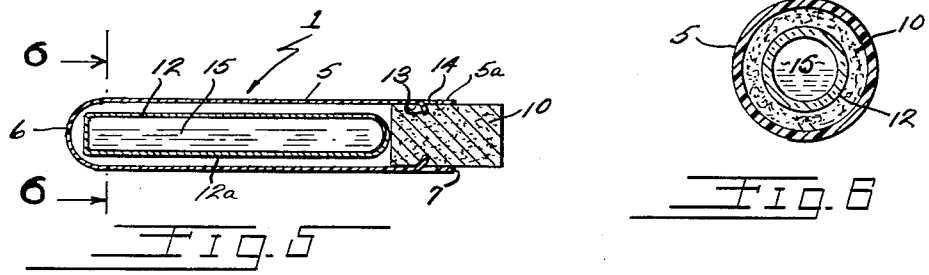

The present invention is directed to a dispenser for cleaning and rejuvenating rubber windshield wiper blades to very effectively and quickly renew the blades so that their associated windshields can be cleaned without leaving a vision-obstructing oily film.

The windshield wipers of a vehicle such as an automobile or a truck often cannot effectively clean a windshield due to oil, dirt and other foreign matter that stick to the windshield and form streaks and smudges.

The present invention provides a novel dispenser to quickly and effectively rejuvenate a rubber windshield wiper blade. A rejuvenated blade, cleaned with the novel dispenser of the present invention, will clean a windshield quickly and effectively, leaving the same free from oily and other vision-obstructing streaks.

It is an object of the present invention to provide a novel dispenser for rejuvenating rubber windshield wiper blades so that the blades can be very easily and quickly cleaned whereby the windshield can be kept free of vision-obstructing films.

It is an object of the present invention to provide an easily used, handy dispenser for rejuvenating rubber windshield wiper blades whereby the windshield can be kept free of oily streaks and smudges.

It is an object of the present invention to provide a novel, easy-to-use dispenser for holding a liquid cleaner composition and for applying the liquid composition to a rubber windshield wiper blade to quickly and effectively clean and rejuvenate the same.

Other objects will be apparent from the specification that follows, the appended claim and the drawings in which:

FIG. 1 is a perspective view of a novel dispenser for cleaning and rejuvenating rubber windshield wiper blades;

FIG. 2 is a side elevational view of the dispenser of FIG. 1 illustrating a person crushing the glass capsule on the inside thereof, the person crushing the same between his thumb and forefinger;

FIG. 3 is a perspective view of the dispenser, the wettened swab end thereof being applied to the wiping edge of a rubber windshield wiper blade;

FIG. 4 is an exploded view of the dispenser showing the outer onion skin tube, the inner glass capsule and the absorbent swab before assembly thereof;

FIG. 5 is a sectional side elevational view of the dispenser; and

FIG. 6 is a sectional view taken along the line 6—6 indicated in FIG. 5.

The present invention provides a dispenser for a liquid composition that can be applied to the working edge of a rubber windshield wiper blade whereby a windshield can be quickly and easily cleaned without leaving any vision-obstructing streaks.

As seen in the drawings, a dispenser 1 comprises an onion skin tube 5 having a closed end 6 and an open end 7. A generally cylindrical cotton swab 10 is disposed tightly within the open end 7, the marginal portion of wall 5a of the tube 5 near the open end 7 being provided with a pair of radially spaced cleats 13 that project downwardly and inwardly from the tube wall and clamp approximately near the mid-point thereof to tightly hold the swab 12 therewithin. As seen in the drawings, and particularly FIGS. 5 and 6, the cleats 13 are formed by partially punching out from the tube wall a pair of spaced slots 14, the material removed from the wall being bent downwardly along one edge of the slots to form the cleats 13. A frangible thin glass capsule 12 containing a liquid wiper blade cleaner 15 is rigidly disposed between the swab 10 and the closed end 6 of the onion skin tube. As best seen in FIG. 2, the inner surface of the wall 5a of the onion skin tube 5 is about equally spaced from the outer surface of the wall 12a of the glass capsule 12.

The glass capsule is water tight, but can be easily crushed between a person's fingers to thereby wet the swab for quick and convenient application to a windshield wiper blade. As best seen in FIGS. 4 and 5, the curved end of the glass capsule 12 is generally the end that is easier crushed than the thicker blunt end. For that reason, the curved end is preferably located adjacent the cotton swab. Once the capsule is crushed, the exposed end of swab 10 is rubbed firmly along the feather edge or wiping edge 17 of a rubber blade 18 to clean and rejuvenate the same. See FIG. 3.

The liquid cleaner 15 preferably includes a basic ingredient of ammonium hydroxide and an odor-masking ingredient such as essence of lemon. The application of the ammonium hydroxide base cleaner by the swab 12 apparently swells a very thin outer layer of the old abraded rubber surface of the blade 18 and removes the same to expose a fresh, clean rubbery surface for cleaning.

A preferred liquid cleaner particularly adapted for use with the novel dispenser 1 has the following composition:

| Ingredients— | Parts by weight |
|---|---|
| Ammonium hydroxide | 5 |
| Sodium tripolyphosphate | 3 |
| Surface active agent comprising a reaction product of 14 moles of ethylene oxide and 1 mole of tall oil | 2 |
| Coloring agent: blue | 1/10 |
| Odor masking agent: essence of lemon | 1/10 |
| Water—Balance to make 100 parts by weight of the solution. | |

The above liquid rejuvenating composition is preferably used in a dispenser that contains approximately 1 to 1½ cubic centimeters and one in which the diameter of the onion skin tube is about ¼ to ⅛ the length thereof. The swab is preferably inserted into the onion skin tube a distance of ¼ to ½ the length of the tube whereby generally about ¼ to ½ of the length of the swab extends from the end of the tube to provide an adequate amount of soaked surface for effective cleaning. In addition to the above dimensions, the glass capsule 12 preferably has a wall thickness of about .006 to 0.008 inch and the onion skin tube generally has a wall thickness of approximately .005 to .007 inch.

It is to be understood that in accordance with the provisions of the patent statutes, the particular form of product shown and described and the particular procedure set forth are presented for purposes of explanation and illustration and that various modifications of said product and procedure can be made without departure from the invention.

What is claimed is:

A dispenser for a liquid composition adapted to clean and rejuvenate rubber windshield wiper blades, said dispenser comprising an outer tube of onion skin having a thin side wall and a closed end wall, an inner elongated generally cylindrical glass capsule containing a liquid blade cleaner disposed within said tube, said cleaner comprising water, ammonium hydroxide, sodium tripolyphosphate, a reaction product of 14 moles of ethylene oxide and 1 mole of tall oil, a coloring agent, and essence of lemon, said capsule having closed end portions that are blunt to prevent accidental breakage of said end portions, the capsule having thin walls adapted to being crushed by finger pressure, there being an open end to said onion skin tube and an absorbent cotton swab disposed therein whereby the crushing of the glass capsule causes the liquid cleaner to wet the swab but the cleaner does not penetrate the onion skin walls.

References Cited in the file of this patent

UNITED STATES PATENTS

| | | |
|---|---|---|
| 1,007,492 | Ruch | Oct. 31, 1911 |
| 1,166,896 | Garvey | Jan. 4, 1916 |

FOREIGN PATENTS

| | | |
|---|---|---|
| 153,904 | Australia | July 25, 1938 |
| 1,130,737 | France | Oct. 8, 1956 |